Dec. 15, 1970                D. I. GARCIA VIDAL                3,546,952
     MECHANISM FOR CONVERTING THE OSCILLATORY RECTILINEAR MOVEMENT
                OF A PRIME MOVER INTO CIRCULAR MOVEMENT
Filed Dec. 20, 1968
                                                        2 Sheets-Sheet 1
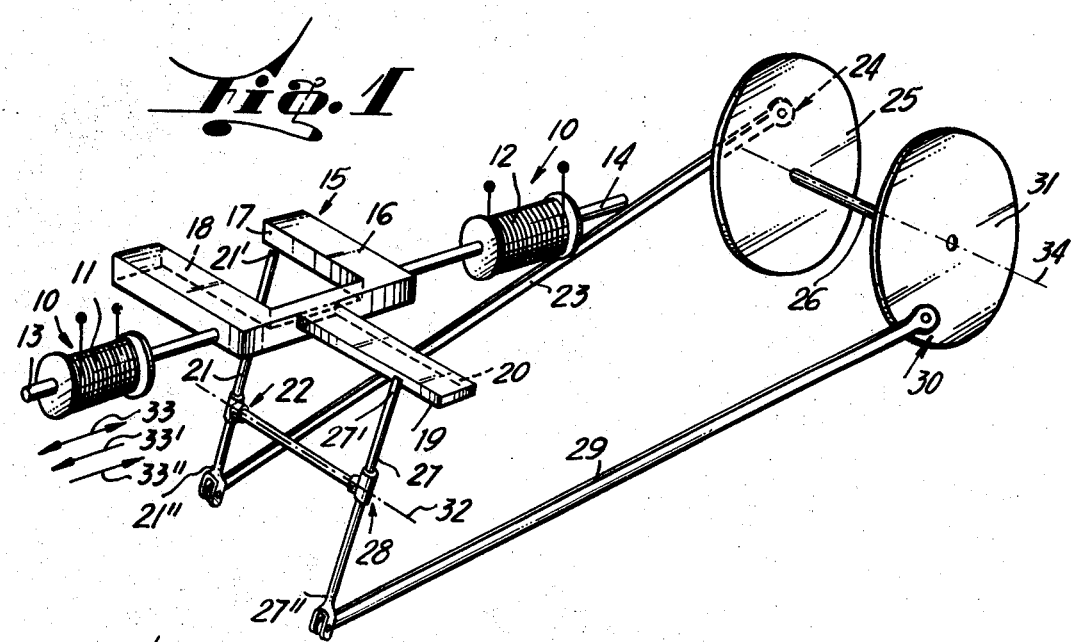
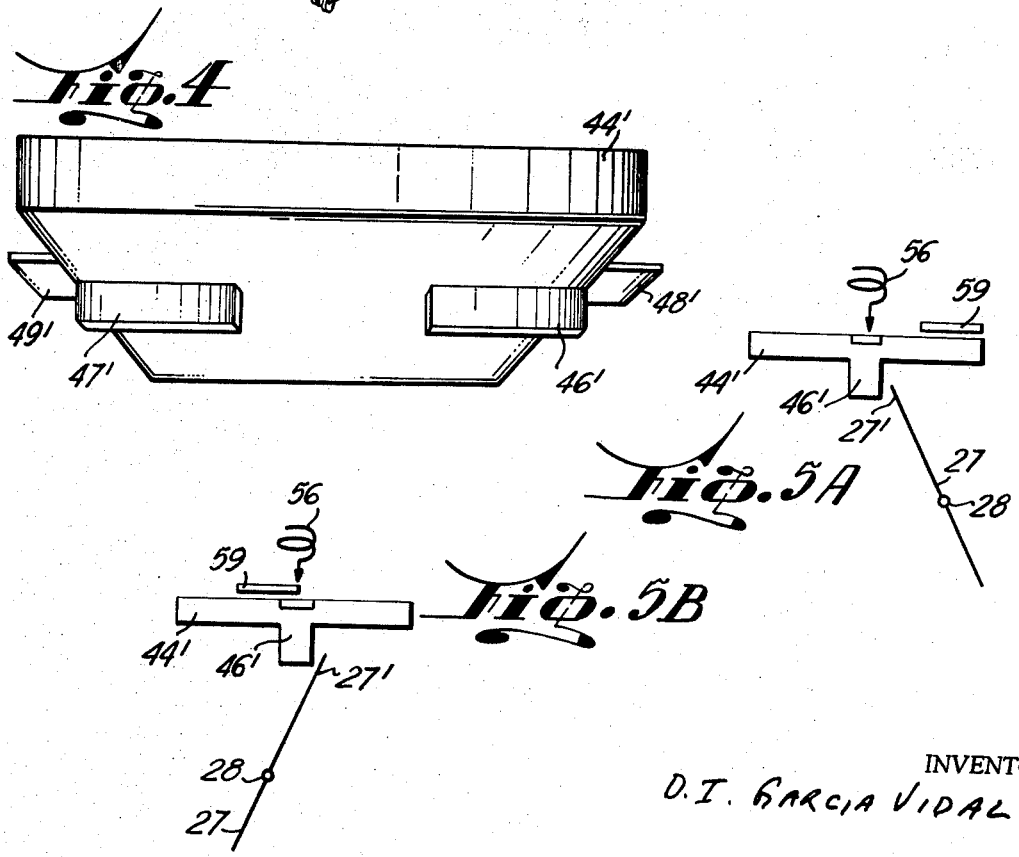
INVENTOR
D. I. GARCIA VIDAL
BY [signature]
ATTORNEYS

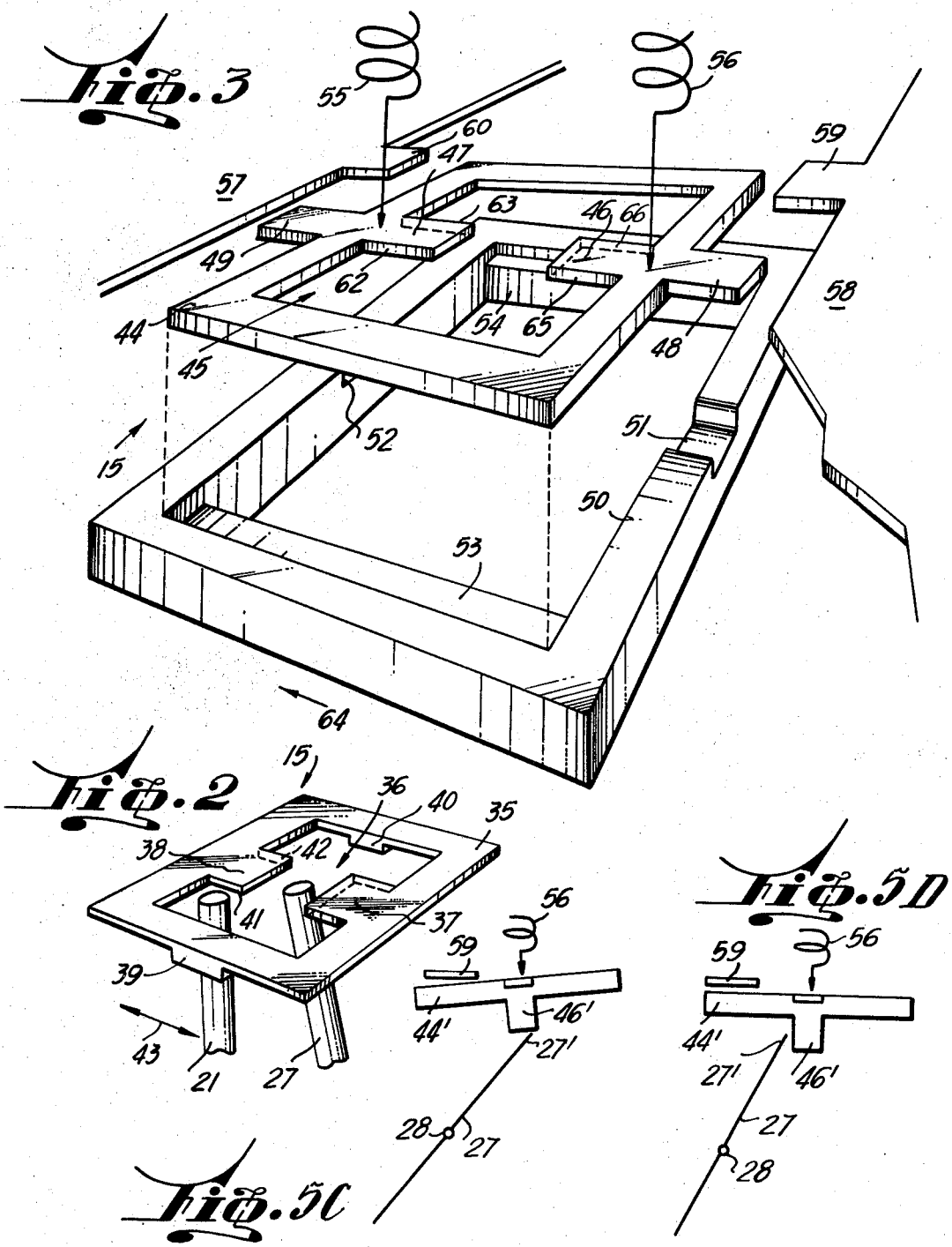

United States Patent Office 3,546,952
Patented Dec. 15, 1970

3,546,952
MECHANISM FOR CONVERTING THE OSCILLATORY RECTILINEAR MOVEMENT OF A PRIME MOVER INTO CIRCULAR MOVEMENT
Daniel Ildefonso Garcia Vidal, 487 Rincon St., Montevideo, Uruguay
Filed Dec. 20, 1968, Ser. No. 785,719
Claims priority, application Uruguay, Dec. 27, 1967, 16,788
Int. Cl. F16h 21/02
U.S. Cl. 74—40                              2 Claims

ABSTRACT OF THE DISCLOSURE

A mechanism for converting the oscillatory rectilinear movement of a prime mover into circular movement has an integral driving member connected to the prime mover and is oscillated rectilinearly thereby. A pair of independent levers of substantially identical length are fulcrumed about spaced apart points on a common axis perpendicular to the direction of rectilinear movement. The integral driving member has a first driving portion and a second driving portion, each one positioned at a different distance from the common axis and are spaced apart, in the direction of the axis, a distance substantially coinciding with the distance between the fulcrum points. Each lever has a first end and a second end, the first ends alternately abutting the first and second driving portions during the oscillatory movement, thereby converting the oscillatory movement into dephased oscillatory curvilinear movement of said second ends about the common axis. Two connecting rods are pivoted to the second ends and to a rotatably mounted driven member at circumferentially dephased eccentric points to impart circular movement to the driven member. The driving integral member may be, for example, Y-shaped, with the first driving portion being the surfaces of the interior of the Y, and with the second driving portion being the surfaces of the leg of the Y.

BACKGROUND OF THE INVENTION

Field of the invention

The present invention relates to a mechanism for converting the oscillatory rectilinear movement of a prime mover into circular movement.

Description of the prior art

It is known in the field of mechanics to which the present invention relates that it is very frequently necessary to convert the oscillatory rectilinear movement of a prime mover, such as a cylinder and piston engine, into circular movement, for example, of a pair of drive wheels of a vehicle.

It is also known that those mechanisms which have been conceived for the above mentioned purpose are subject to two fundamental drawbacks:

The first is related to the existence of dead center positions, due to which these known mechanisms provided for converting the oscillatory movement into circular movement require unavoidably that further means be provided to place the different components, each time the mechanism is halted, in a position such that the oscillating driving source can always, when necessary, recommence the required circular movement. The second drawback is the impossibility for these mechanisms to always and individually convert, upon commencement of movement, the oscillatory movement into circular movement in the same direction. In this respect it is to be noted that the final position of the components of those known mechanisms, when halted, determines the direction of circular motion when movement is recommenced.

These two drawbacks have always made it necessary for the known mechanisms to be provided with means for avoiding the positioning of the mechanism in a dead center position and to enable the circular movement to always be commenced in the same direction.

SUMMARY OF THE INVENTION

Accordingly, it is an object of the present invention to provide a mechanism for converting oscillatory rectilinear movement into circular movement and which has no dead center positions.

A further object of the present invention is to provide a mechanism for converting oscillatory rectilinear movement into circular movement wherein the circular movement provided is always in the same direction.

A further object of the present invention is to provide a mechanism which in addition to the two foregoing objects is easier and more economical to manufacture, due to it not requiring any additional components for overcoming the drawbacks of the known mechanisms.

In accordance with the present invention there is provided a mechanism for converting the oscillatory rectilinear movement of a prime mover into circular movement comprising means connected to said prime mover to be caused to effect a similar movement, two levers adapted to abut, by one end, against said means, during oscillation thereof, to convert the oscillatory movement of said means into dephased oscillatory curvilinear movement of their other ends, and two connecting rods pivoted between these last mentioned ends of said levers and a driven member, to impart circular movement thereto.

BRIEF DESCRIPTION OF THE DRAWINGS

In order to facilitate the comprehension of the present invention, reference will now be made to various specific embodiments, by way of example, to the accompanying drawings, wherein:

FIG. 1 is a schematic perspective view illustrating the fundamental components of the simplest embodiment of the present invention;

FIG. 2 is a schematic perspective view of an alternative embodiment of part of the mechanism of the present invention;

FIG. 3 is a schematic perspective exploded view of a further alternative embodiment of part of the mechanism of the present invention;

FIG. 4 is a lower perspective view of one of a still further alternative embodiment slightly modified with respect to that of FIG. 3;

FIGS. 5A, 5B, 5C and 5D are schematic representations of the different relative positions of the component illustrated in FIG. 4 and one of the driven levers.

DESCRIPTION OF THE PREFERRED EMBODIMENTS

Referring in first place to the embodiment of FIG. 1, reference numeral 10 corresponds to a prime mover, capable of describing an oscillatory rectilinear movement and which, for example, could be a cylinder and piston engine or, as has been illustrated, two solenoids 11 and 12 having respective ferromagnetic core members 13 and 14 extending therethrough. Solenoids 11 and 12 are wound in opposite directions for the reasons to be explained later on. Ferromagnetic core members 13 and 14 are each secured to means 15 defined by a Y-shaped member 16 which due to its connection to core members 13 and 14 is caused, during operation, to effect an oscillatory rectilinear movement similar to that of prime mover 10. Y-shaped member 16 comprises a first driving portion defined by interior lateral walls 17 and 18 and a second driving portion defined by external side walls 19 and 20.

A first lever 21 having a first end portion 21' and a second end portion 21" is positioned so that said first end portion 21' is positioned between interior lateral walls 17 and 18 within Y-shaped member 16. Lever 21 is fulcrumed about 22 while its second end portion 21" is pivoted to one end of a connecting rod 23, the other end of which is pivoted at 24 to a driven member 25 rotatably mounted with a shaft 26. Similarly, a second lever 27 is pivoted about 28 and has a first end 27' and a second end 27", its first end 27' being adapted to intermitently abut side walls 19 and 20 while its second end 27" is pivoted to one end of a second connecting rod 29, the other end of which is pivoted at 30 to a further driven member 31 rotatably mounted with axis 26.

In accordance with the preferred and simplest embodiment of the present invention, levers 21 and 27 are of substantially identical length and fulcrum points 22 and 28 should be spaced apart a predetermined distance on a common axis 32 perpendicular to the direction of the rectilinear movement caused by the energization of solenoids 11 and 12 and represented by arrow 33. The distance along common axis 32 between fulcrum points 22 and 28 must be such that the first ends 21' and 27' of first lever 21 and second lever 27 are adapted to respectively contact interior lateral walls 17, 18 and side walls 19, 20. In order that the mechanism carry out the function for which it has been designed it is necessary that the distance, taken perpendicularly to axis 32, between axis 32 and the nearmost portion of interior lateral walls 17 and 18 be larger than the distance, also taken perpendicularly to axis 32, between axis 32 and the nearmost portion of side walls 19 and 20. In other words, the distance between the lower face (not seen) of the first driving portion and axis 32 be larger than the distance between the lower face (not seen) of the second driving portion and axis 32 (both distances being taken perpendicularly to axis 32).

Driven member 25, shaft 26 and driven member 31 define a rigid structure adapted to rotate as a whole about axis 34. It will be obvious to those skilled in the art that in place of the illustrated driven member arrangement there could be provided a cylinder member having each one of the connecting rods 23 and 29 pivoted thereto at circumferentially dephased eccentric points.

It has been found that levers 21, 27 need not be of the same length, in such an event it being necessary to vary the above mentioned distances between the lower faces of the first and second driving portion and axis 32, and also vary the respective distances between fulcrum points 24 and 30 and axis 34. Such a solution, although not specifically described, is understood to be within the scope of the appended claims inasmuch as it is merely a question of design to arrive at the interrelationship between the mentioned distance and lengths in order to achieve, during operation, a synchronized driving effect on shaft 26.

In order to facilitate the interpretation of the remaining embodiments, the operation of the embodiment of FIG. 1 will now be described.

In order to produce an oscillatory rectilinear movement, solenoids 11 and 12 are coiled in different directions and connected through an appropriate switching device (not shown) to a power source. This mentioned switching device can be of any appropriate type, the only requirement being that its operation be synchronized with the oscillatory rectilinear movement to be achieved, to thereby connect solenoids 11 and 12 alternatively to the power source.

In this way upon, for example, initial energization of solenoid 11, ferromagnetic members 13 and 14 will be drawn in the direction of arrow 33'. In this way, second lever 27 will be abutted by side wall 19 and rotated in a counter clockwise direction about pivot point 28 thereby, through second connecting rod 29, rotating driven member 31, shaft 26 and driven member 25 also in a counter clockwise direction.

This movement will (through connecting rod 23) rotate first lever 21 in a clockwise direction drawing the first end 21' of first lever 21 towards closer relationship with interior lateral wall 17. The driving abutment between side walls 19 and the first end of second lever 27 will continue, while the distance between axis 32 and the lowermost portion of side wall 19 is smaller than the length of second lever 27 between axis 32 and its first end 27'. Once the distance between the lowermost portion of side wall 19 and axis 32 is greater than that of the just mentioned portion of lever 27, side wall 19 will slip over the first end 27' of second lever 27 at which precise moment the first end 21' of first lever 21 should come into contact with interior lateral wall 17. In this way and due to the abutting contact between the first end 21' of first lever 21 and interior lateral wall 17, first lever 21 will be driven in a counter clockwise direction thereby continuing the counter clockwise rotation of driven member 25, shaft 26 and driven member 31. Once driven member 25, shaft 26 and driven member 31 have rotated half a turn, the above mentioned switching means will disconnect solenoid 11 and automatically connect solenoid 12 thereby drawing ferromagnetic members 13 and 14 and means 16 in the direction of arrow 33". At the time of switch over, the first end 27' of second lever 27 will enter into abutting contact with side wall 20 thereby producing a rotation of second lever 27 about pivot point 28 in a clockwise direction thereby further continuing the rotary motion of driven member 25, shaft 26 and driven member 31. Here again, there will be a driving contact between the first end 27' of second lever 27 and side wall 20 while the distance between the lower face of the second driving portion defined by side walls 19 and 20 and axis 32 is greater than the length of second lever 27 between pivot point 28 and the first end 27' thereof. Thereafter, the above mentioned second driving portion will pass over the first end 27' of second lever 27 at which time the first end 21' of first lever 21 will abut against interior lateral wall 18 which will, in turn, produce the rotation of first lever 21 in a clockwise direction about pivot point 22 further continuing the rotation of a driven member 25, shaft 26 and driven member 31. In this way, levers 21 and 27 are adapted to alternately abut the driving means during the oscillatory movement thereof to convert the oscillatory rectilinear movement of prime mover 10 into dephased oscillatory curvilinear movement of the second ends 21" and 27" of levers 21 and 27. It will be seen as from now that if levers 21 and 27 are fulcrumed about a common axis 32 and if levers 21 and 27 are of similar length, the minimum distance between the lower face of the first driving portion defined by interior lateral walls 17 and 18 and axis 32 should be less than the minimum distance between the lower face of second driving portion defined by side walls 19 and 20 and axis 32 to thereby enable the first end 27' of second lever 27 to pass, during part of the operation, below the lower face of the second driving portion while simultaneously maintaining the first end 21' of first lever 21 trapped between interior lateral walls 17 and 18.

It has been found that by rotating Y-shaped member 16 in 180° in its own plane, that the direction of rotation of driven member 25, shaft 26 and driven member 31 can be inverted. With such a rotation first end 21' will act against side walls 19 and 20 while first end 27' will act against interior lateral walls 17 and 18.

Referring now to FIG. 2 therein there is illustrated an alternative embodiment of that of FIG. 1. The embodiment of FIG. 2 has been conceived to provide means for inverting the direction of rotation of driven member 25, shaft 26 and driven member 31 without having to rotate means 15 as just described.

The components illustrated in FIG. 2 are functionally equivalent to means 15, first lever 21 and second lever 27 and therefore the same reference numerals have been used.

It is to be understood that FIG. 2 does not illustrate the entire mechanism inasmuch as the only difference between this embodiment and that of FIG. 1 are in the components shown, the remaining parts, as well as their functional interrelationship being similar. In the embodiment of FIG. 2, plate member 35 replaces Y-shaped member 16. Plate member 35 defines a cut-out portion 36 and is provided with two lugs 37 and 38 extending into cut-out portion 36. Plate member 35 is also provided with two downwardly extending projections 39 and 40. In this embodiment the same considerations as made with respect to the embodiment of FIG. 1, in connection with the length of levers 21, 27, as well as the distance between axis 32 and the lower face of lugs 37, 38 and the distance between axis 32 and the lower faces of downwardly extending projections 39 and 40, are applicable.

Lever 27 is adapted to abut alternatively against downwardly extending projections 39 and 40 while lever 21 is adapted to abut alternatively against faces 41 and 42.

It will be seen that plate member 35 due to its connection to ferromagnetic members 13 and 14 is caused (upon energization of solenoids 11 and 12) to effect an oscillatory rectilinear movement. In this embodiment, plate member 35 defines the above mentioned second driving portion by faces 41, 42 of lug 38 while said first driving portion is defined by downwardly extending projections 39 and 40.

As pointed out above, the embodiment of FIG. 2 is specially useful when it is necessary to provide a mechanism which can, without substantial complication, convert an oscillatory rectilinear movement into circular movement in one or the other direction. To this end, plate member 35 is slidably mounted in the direction of arrow 43 thereby enabling, in one position, levers 21 and 27 to be as shown in FIG. 2, while, in the second position, lever 21 will be adapted to abut against (and thereby be driven by) downwardly extending projections 39 and 40 while lever 27 will be adapted to abut against (and thereby be driven by) the lateral faces of lug 37.

Referring now to the alternative embodiment of FIG. 3, the components therein illustrated are intended to replace means 15 of FIG. 1 and be a further development of the means 15 illustrated in FIG. 2. The remaining components of the mechanism of FIG. 1 remain unchanged, their functional interrelationship being also substantially identical.

Referring specifically to FIG. 3, means 15 comprise a plate member 44 defining a cut-out portion 45 and including two lugs 46 and 47 extending into cut-out portion 45. Plate member 44 is supported by means of protruding members 48 and 49 upon a bracket member 50 defining cut-out portions 51 and 52 adapted to receive protruding members 48 and 49. Bracket member 50 has shoulder portions 53 and 54, one at each end thereof, upon which part of the lower face of plate member 44 is adapted to rest. Biasing means 55 and 56 (schematically represented) are provided to maintain plate member 44 seated upon bracket member 50. Furthermore, plate members 57 and 58 are also provided and include protruding portions 59 and 60 adapted to rest on the upper face of plate member 44 in order to inhibit the upward movement of plate member 44 if pushed from below by the levers (only shown in FIGS. 1 and 2) operating within cut-out portion 45, as will be described later on in connection with FIGS. 5A to 5D.

Referring now to FIG. 4 therein there is illustrated an alternative embodiment of plate member 44 of FIG. 3. Plate member 44' includes protruding members 48' and 49' adapted to rest in cut-out portions 51 and 52 of bracket member 50. Plate member 44' is also adapted to rest upon shoulder portions 53 and 54 as described in connection with the embodiment of FIG. 3. Plate member 44' also comprises downwardly extending abutment members 46' and 47'.

In the embodiment of FIG. 3, levers 21 and 27 operate within cut-out portion 45 and between shoulder portions 53 and 54. Similarly as illustrated for the embodiment of FIG. 2 lever 21 can abut against side faces 62, 63 of lug 47 in which case lever 27 will operate by abutting against shoulder portions 53 and 54, or in order to obtain a different direction of rotation for driven member 25, shaft 26 and driven member 31, as already explained in connection with FIG. 2, it is possible to shift means 15 (FIG. 3) in the direction represented by arrow 64 thereby placing first lever 21 between lugs 46 and 47 and thereby in a position to abut against shoulder portions 53 and 54 while second lever 27 will be shifted to abut against side faces 65, 66 of lug 46. In this embodiment either of levers 21 and 27 will also be able to pass below lugs 46 and 47 during part of the movement of means 15 (FIG. 3) similarly as occurs in the embodiment of FIG. 1 in connection with side walls 19 and 20 and lever 27. It is to achieve this effect that the lowermost part of plate member 44 is above the lowermost part of bracket member 50.

In the embodiment of FIG. 4, and during operation, one of the levers 21 or 27 will move between downwardly extending abutment members 46' and 47' and thereby be driven by shoulder portions 53 and 54, while the other lever 27 or 21 will abut against and pass under the lateral faces of downwardly extending abutment members 46' and 47'.

In this way the above mentioned second driving portion is defined by abutment members 46' and 47' while the first driving portion is defined by shoulder portions 53 and 54 (FIG. 3).

With the embodiment illustarted in FIG. 4, and during operation, it has happened that the first end 21' or 27' of levers 21 and 27 gets wedged in the angle defined by the horizontal portion of plate member 44' and the vertical lateral faces of downwardly extending abutment members 46' or 47'. Similarly, it has occurred that this same first end instead of abutting side faces 62, 63, 65 and 66 (FIG. 3) contacts the lower face of lugs 46 and 47 thereby tending to raise plate member 44' or plate member 44, respectively out of its seat upon bracket 50. In order to reset plate member 44 or plate member 44' in place upon bracket member 50 when this should occur, biasing means 55 and 56 are provided.

The necessity of plate members 57 and 58 as well as another reason for providing biasing means 55 and 56 can be better understood by referring to FIGS. 5A to 5D. During operation of the embodiment of FIGS. 3 and 4, it is possible for the levers 21 or 27 to become wedged as pointed out above, thereby unseating plate member 44 or plate member 44' from bracket member 50. However, even if this should not happen it has been found in practice that it is advisable to provide downwardly extending abutment members 46' and 47' to enable levers 21 or 27 to enter into better driving abutment with the respective driving portions and therefore when plate member 44 or 44' and more specifically lugs 46 or 47 and downwardly extending abutment members 46' or 47' pass over either lever 21 or 27, plate member 44 or 44' is unseated and reseated after such vertical displacement thereof. Plate members 57 and 58, together with protruding portions 59 and 60 are provided so as to establish and maintain a good driving and abutting contact between plate member 44 or plate member 44' and first end 21' or 27' during their relative movement and thereafter enable plate member 44 or plate member 44' to pass over first end 21' or 27' and return to its normal position thereafter. For example, in FIG. 5A, first end 27' abuts against downwardly extending abutment member 46', such an abutting contact being maintained because plate member 44' cannot move upwardly due to the position of protruding portion 59. However as shown in FIGS. 5B and 5C, once it is necessary for plate member 44' and downwardly extending abutment member 46' to pass over first end 27', protruding portion 59 is in a position such that plate member 44' can be rocked to pass thereover. Thereafter, first end 27′ will be in the position illustrated in FIG. 5D and the driving contact between lug 46 and first end 27′ will be maintained due to the position of protruding portion 59 with respect to plate member 44′.

It will be understood that improvements may be introduced into the embodiments described by way of example and modifications may be made in the constructions and material employed without departing from the scope of the invention specifically defined in the following claims.

I claim:

1. A mechanism for converting the oscillatory rectilinear movement of a prime mover into circular movement always in the same direction and lacking dead center positions, comprising an integral movement transmitting member connected to said prime mover to be caused to effect an oscillatory rectilinear movement, a first lever fulcrumed at a first point and a second lever fulcrumed at a second point spaced apart from said first point, both said first and second levers being fulcrumed about pivot axes perpendicular to the direction of said recilinear movement, said levers having a first end and a second end, said first ends being adapted to alternately abut said member during the oscilltory movement thereof to convert said oscillatory rectilinear movement into dephased oscillatory curvilinear movement of said second ends about said pivot axes, and two connecting rods pivoted to said second ends and to at least one rotatably mounted driven member, at circumferentially dephases eccentric points to thereby impart circular movement to said driven member.

2. A mechanism for converting the oscillatory rectilinear movement of a prime mover into circular movement always in the same direction and lacking dead center positions, comprising an integral movement transmitting member connected to said prime mover to be caused to effect an oscillatory rectilinear movement, a pair of independent levers of substantially identical length fulcrumed about two points spaced apart a predetermined distance on a common axis perpendicular to the direction of said rectilinear movement, said member comprising a first driving portion and a second driving portion, each one of these portions being positioned at different distances from said common axis, and spaced apart, in the direction of said axis, a distance substantially coinciding with the distance between said fulcrum points, said levers having a first end and a second end, said first ends being adapted to alternately abut said first and second portions during the oscillatory movement of said member, to convert said oscillatory rectilinear movement into dephased oscillatory curvilinear movement of said second ends about said common axis and two connecting rods pivoted to said second ends and to at least one rotatably mounted driven member, at circumferentially dephased eccentric points to thereby impart circular movement to said driven member.

References Cited
UNITED STATES PATENTS

| | | | |
|---|---|---|---|
| 3,130,592 | 4/1964 | Burrison | 74—40 |
| 3,459,056 | 8/1969 | Lea | 74—29 |

WESLEY S. RATLIFF, JR., Primary Examiner